United States Patent [19]

Ammann et al.

[11] Patent Number: 4,810,873
[45] Date of Patent: Mar. 7, 1989

[54] METHOD AND DEVICE FOR AUTOMATIC COMPENSATION OF THE ATTENUATION OF A FIBER OPTICAL MEASUREMENT VALUE TRANSMISSION

[75] Inventors: Urs Ammann, Wettingen; Thomas Dobler; Martin Maschek, both of Würenlos; Georg Mastner, Niederrohrdorf, all of Switzerland

[73] Assignee: BBC Brown Boveri AG, Baden, Switzerland

[21] Appl. No.: 113,864

[22] Filed: Oct. 29, 1987

[30] Foreign Application Priority Data

Nov. 10, 1986 [DE] Fed. Rep. of Germany ....... 3638316

[51] Int. Cl.$^4$ .............................. H01J 5/16; H01J 40/14
[52] U.S. Cl. ............................... 250/227; 250/214 C
[58] Field of Search ........................... 250/227, 214 C; 356/73.1; 350/96.20; 455/610, 612

[56] References Cited

U.S. PATENT DOCUMENTS 4,446,366  5/1984  Brogardh et al. ................... 250/227
4,644,145  2/1987  Günder ............................. 250/227

OTHER PUBLICATIONS

NOT/912-05/86, May 1986, Melopee, Multichannel EMP/Lighting-Data Acquisition and Measurement System, Thomson CSF, 31, rue Camille Desmoulins/BP 12-92132 Issy Les Moulineaux, France, pp. 25-28.
U. Tietze/Ch. Schenk, Halbleiter-Schaltungstechnik (Semiconductor Circuit Technology), 5th edition, Springer-Verlag Berlin, Heidelberg, New York 1980, p. 413.
Grundkurs Der Regelungstechnik, by Dr. Ing. Ludwig Merz, R. Oldenbourg Munich, Germany 1964.A/-1-A/3.

Primary Examiner—David C. Nelms
Assistant Examiner—William L. Oen
Attorney, Agent, or Firm—Oblon, Fisher, Spivak, McClelland & Maier

[57] ABSTRACT

Measurement value signals (S1), for example from a signal transmitter which is located at high-voltage potential, which are transmitted by a signal transmitter (1) with a transmit diode (6) on the high voltage side via an optical waveguide (8) to a signal receiver (9) with a photodiode (10) at ground potential, are subject to an optical signal attenuation along the way. To ensure automatic attenuation compensation both for alternating and for direct voltage measurement signals (S1), a reference direct current ($I_{REF}$) is fed back to the transmit diode (6). The transmission system is calibrated before each measurement. During this process, the input of an amplifier (4) of the signal transmitter (1) is connected to reference potential (U0) via a switch (3) and the gain factor of the signal receiver (9) is controlled in such a manner that its output signal (S9) is equal to a predeterminable reference voltage ($U_{REF}$). The output signal (S14) of a differential amplifier (14) is supplied via a lowpass filter (16) and a 1st post amplifier (17) to an instantaneous-value memory (18), the output signal (S18) of which controls the gain factor. After the calibrated state has been reached, the closed-loop control circuit is interrupted so that the gain factor remains constant until a new calibration is performed. The gain factor can be adjusted via electrically, electromechanically or optically controllable resistances or a multiplier or via the bias voltage of an avalanche photodiode (10).

10 Claims, 2 Drawing Sheets

METHOD AND DEVICE FOR AUTOMATIC COMPENSATION OF THE ATTENUATION OF A FIBER OPTICAL MEASUREMENT VALUE TRANSMISSION

TECHNICAL FIELD

The invention is based on a method for automatic compensation of the attenuation of a fiber optical measurement value transmission according to the introductory clause of claim 1 and on an automatic attenuation compensation device according to the introductory clause of claim 5.

PRIOR ART

In the introductory clause of claims 1 and 5, the invention refers to a prior art of method and device for automatic compensation of the attenuation of a fiber optical measurement value transmission such as is known from the printed company document: NOT/912-05/86, May 1986, MELOPEE, MULTI-CHANNEL EMP/LIGHTING - DATA ACQUISITION AND MEASUREMENT SYSTEM, THOMSON CSF, 31, rue Camille Desmoulins/BP 12 - 92132 Issy les Moulineaux/France, pages 25–28. In this document, electric measurement values having a very wide frequency spectrum within a range from 100 Hz–150 MHz are transmitted from an optical transmitter with transmit amplifier and subsequent light-emitting transmit diode via a fiber optical cable to an optical receiver with photodiode and subsequent receive amplifier. The receive amplifier is followed by a control circuit with discontinuously variable attenuation having several controllable attenuation sections. To adjust the attenuation, the transmit amplifier is supplied with a calibration signal, instead of the measurement signal which is normally present, via a switch. At the output of the receive amplifier, a receive level is extracted from the calibration signal and used for controlling the attenuation. Slow changes in the optical attenuation can be compensated by repeated calibration, however in each case with restricted resolution which is determined by the magnitude of the smallest step of the controllable attenuation section.

REPRESENTATION OF THE INVENTION

The invention defined in claims 1 and 5 achieves the object of specifying a method and a device for automatic compensation of the attenuation of a fiber optical measurement value transmission which enables a more accurate calibration for direct and alternating voltage signals to be achieved.

An advantage of the invention consists in an improved calibration. This is achieved by the fact that the known discontinuous open-loop control is replaced by a continuous closed-loop control. In this arrangement, a temperature drift of the components of the closed-loop control circuit is also corrected which is not the case with an open-loop control circuit.

Another advantage consists in the simpler and more cost effective circuit in comparison with the open-loop control circuit having more elaborate attenuation sections.

BRIEF DESCRIPTION OF THE DRAWINGS

In the text which follows, the invention is explained by the aid of typical embodiments.

APPROACHES TO CARRYING OUT THE INVENTION

Figure 1:
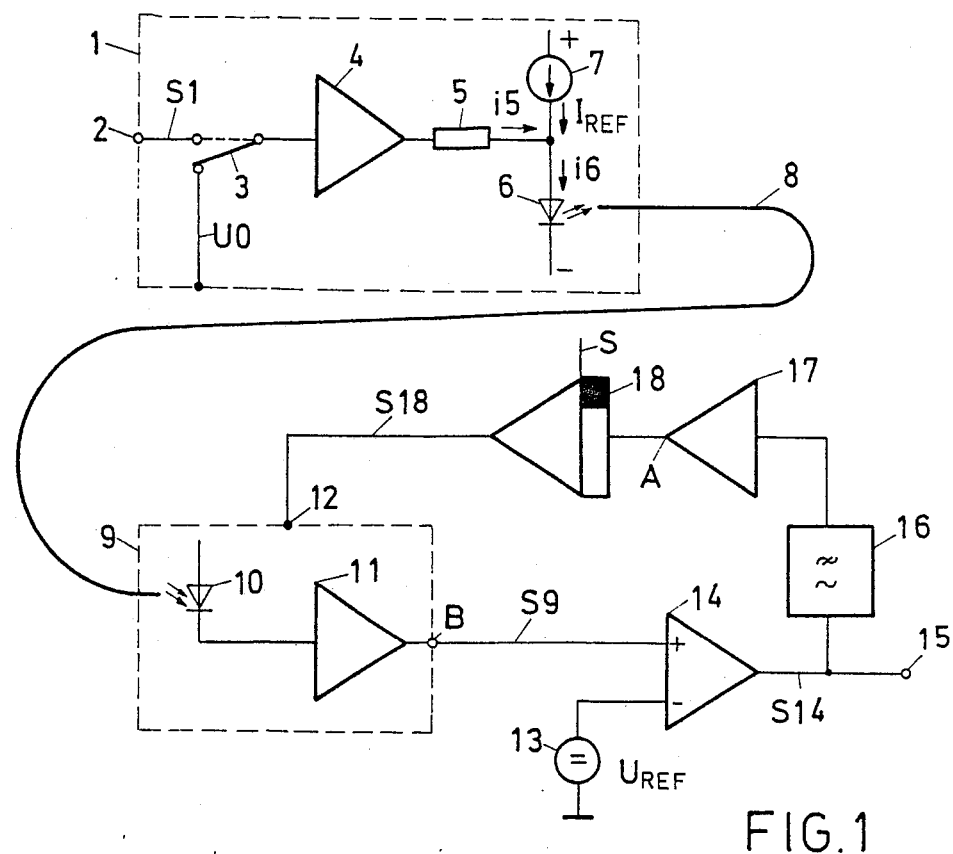
FIG. 1 shows a basic representation of an automatic attenuation compensation device with a signal transmitter, an optical waveguide and a signal receiver with closed-loop control circuit which is connected via an instantaneous-value memory to a gain factor adjusting element of the signal receiver.

In FIG. 1, 1 designates an optical signal transmitter with a signal input 2 for an input or measurement value signal S1 which comes from a signal transmitter which is at high-voltage potential or in an environment with high electromagnetic interference. The signal transmitter 1 is electrically insulated with respect to ground potential. The measurement value signal S1 is supplied via an electronic switch 3 to an amplifier 4 with predeterminable gain. A change-over contact of the switch 3 is connected to the housing of the signal transmitter 1 which exhibits a reference potential U0. The amplifier 4 is connected via an ohmic resistance 5 to an electrooptical transducer or the anode of a transmit diode 6. A light-emitting diode (LED) is preferably used as transmit diode 6. The anode of the transmit diode 6 is connected to a direct current source 7 which supplies a predeterminable reference direct current $1_{REF}$ to the transmit diode. The reference direct current $I_{REF}$ and the bias voltage for the amplifier 4 is supplied by a battery, not shown. A measurement current i5 flowing through the resistance 5 is superimposed on this reference direct current $I_{REF}$ to form a sum or transmit current i6. The cathode of the transmit diode 6 is at a potential which is preferably dimensioned in such a manner that the anode of the transmit diode 6, without measurement signal, is at least approximately at the reference potential U0. The measurement current i5 is then proportional to the input signal of the transmit amplifier 4.

The transmit diode 6 is coupled via a coupler, not shown, to a fiber optical transmission line or an optical waveguide 8 which transmits the light radiated by the transmit diode 6 via a coupler, also not shown, to an optoelectrical transducer or a photodiode 10 of an optical signal receiver 9 which converts the optical signal into an electrical signal. This electrical signal is amplified in an amplifier 11, following the photodiode 10, of the signal receiver 9. The signal receiver 9 is at ground potential.

The output signal S9 present at one output B of the signal receiver 9 is supplied to the non-inverting input of a comparator or subtractor or differential amplifier 14 the inverting input of which is supplied with a reference voltage $U_{REF}$ from a direct voltage source 11. An output signal $S14 = k \cdot (S9 - U_{REF})$ is supplied to a signal output 15 of the automatic attenuation compensation device at which it is available for further evaluation. k designates a constant or a gain factor of the differential amplifier 14.

The difference signal S14 is supplied via a low-pass filter 16 to a 1st post amplifier 17, the output of which is designated by A. The output signal of the 1st post amplifier 17 is supplied via a sample and hold circuit or an instantaneous-value memory 18 to an adjustment input 12 for the gain factor of the signal receiver 9. An output signal S18 of the instantaneous-value memory 18, known per se, follows in the switched-on state, that is to say as a function of a control signal S, the input voltage of the instantaneous-value memory 18. In the switched-off condition, the voltage value at the instant of switching off is stored. The components 9–18 form a closed-loop control circuit. The 1st post amplifier 17 in this arrangement fulfils the function of a proportional (P), proportional-integral (PI) or integral (I) controller.

The optical signal to be transmitted from high-voltage potential to ground potential is attenuated due to the coupling losses in the two optocouplers, not shown, and the attenuation in the optical waveguide 8. For the automatic compensation of this attenuation, the input of the amplifier 4 is first set to reference potential U0 via a remote control by means of the switch 3. In this state, the transmit diode only carries the reference direct current $I_{REF}$ which serves as reference value for adjusting the signal value on the receive side.

All functions are remotely controlled by means of an additional optical fiber and associated transmission devices at the end.

On the receive side, the received component of the light proportional to the reference current $I_{REF}$ is compared with a reference value, the reference voltage $U_{REF}$ and automatically calibrated by a closed-loop control circuit which controls the gain factor of the signal receiver 9. After completed calibration, that is to say when the difference signal S14 has at least approximately a value of zero, the closed-loop control circuit is switched off, the gain factor controlled by the instantaneous-value memory 18 remaining set to the value calibrated by the action of the closed-loop control circuit.

Completion of the calibration is detected by means of a window comparator, not shown, which is connected to the output of the comparator 14. A window comparator can be used for determining whether its input voltage is within the range between two comparison voltages or outside. Such a window comparator is known, for example, from the book: U. Tietze/Ch. Schenk, HalbleiterSchaltungstechnik (Semiconductor Circuit Technology), 5th edition, Springer-Verlag Berlin, Heidelberg, New York 1980, page 413. Circuits for instantaneous-value memory 18 are shown and described there on pages 407–410.

After the calibration, the transmission system is calibrated both for alternating and for direct voltage measurement signals because any change in the direct voltage component in the received light is now interpreted as direct voltage signal and not as change in the transmission factor. As a function of calibration being achieved, the instantaneous-value memory 18 receives the information "store" via its control signal S and the switch 3 is set to the position shown dashed, as a result of which the measurement value signal S1 is supplied to the input of the amplifier 4.

In order to eliminate long-term effects such as heating of the transmit diode 6, attenuation of the fiber optical transmission path which is unstable with time, and so forth, it is to be recommended to perform this automatic calibration before each measurement. This restriction is insignificant in practice since, as a rule, only short-duration measurements are performed because of the limited capacity of the battery for feeding components on the transmit side.

Figure 2:
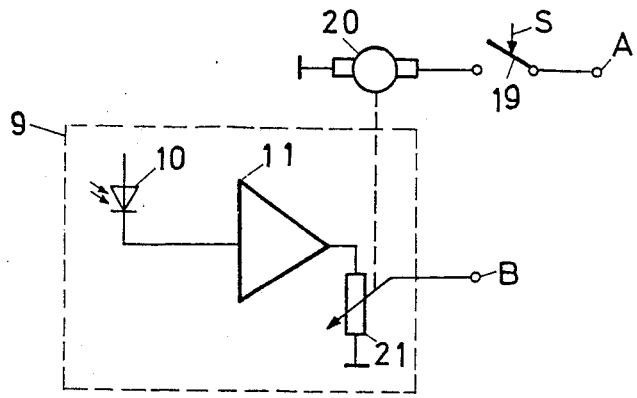
FIG. 2 shows a signal receiver according to FIG. 1 having a motor as instantaneous-value memory and a potentiometer as gain factor adjusting element.

FIGS. 2–5 show various typical embodiments of the optical signal receiver 9 with a gain factor which can be adjusted by an electrical signal S18. Identical reference symbols mark identical objects as in FIG. 1. In FIG. 2, the instantaneous-value memory 18 is formed by a motor 20. The motor 20 controls the gain factor of the signal receiver 9 by means of a potentiometer 21. The motor 20 is connected via an electronic switch 19 to the output A of the 1st post amplifier 17. The switch 19 is opened as a function of the control signal S when calibration has been achieved.

Figure 3:
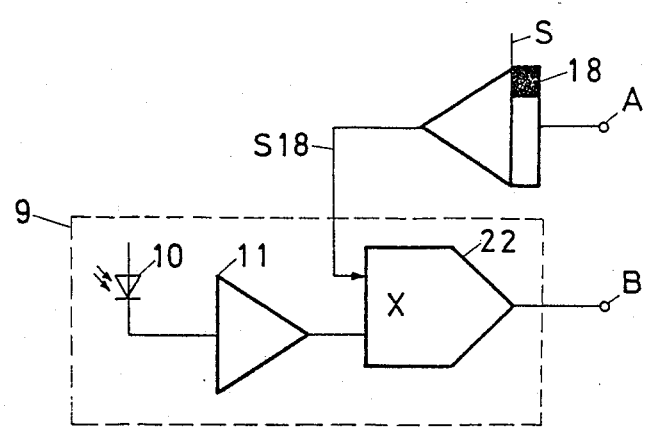
FIG. 3 shows a signal receiver according to FIG. 1 having a multiplier as gain factor adjusting element.

In the typical embodiment according to FIG. 3, the output of the receive amplifier 11 of the signal receiver 9 is connected to a 1st multiplier input of a multiplier 22. A 2nd multiplier input of the multiplier 22 is connected to the output of the instantaneous-value memory 18.

Instead of an analog instantaneous-value memory 18, of course, a zero-drift digital memory can be used which is followed by a digital/analog converter, not shown.

Figure 4:
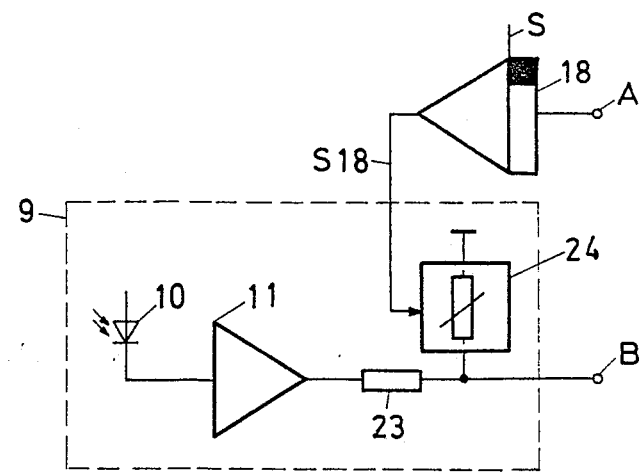
FIG. 4 shows a signal receiver according to FIG. 1 having an electrically or optically controllable resistor as gain factor adjusting element and FIG. 5 shows a signal receiver according to FIG. 1 having an optoelectrical transducer as gain factor adjusting element.

In the typical embodiment of FIG. 4, the output of the receive signal amplifier 11 of the signal receiver 9 is connected to a voltage divider of a resistance 23 and a resistance 24 which can be controlled by an electrical or optical signal. The electrical junciton of the two resistances 23 and 24 is connected to the output B of the signal receiver 9. The resistance 24 can be controlled as a function of the output signal S18 of the instantaneous-value memory 18, either electrically, preferably via a junction-gate field-effect transistor or optically via a photoresistance, not shown, the light intensity being controlled as a function of the amplitude of the output signal S18.

Figure 5:
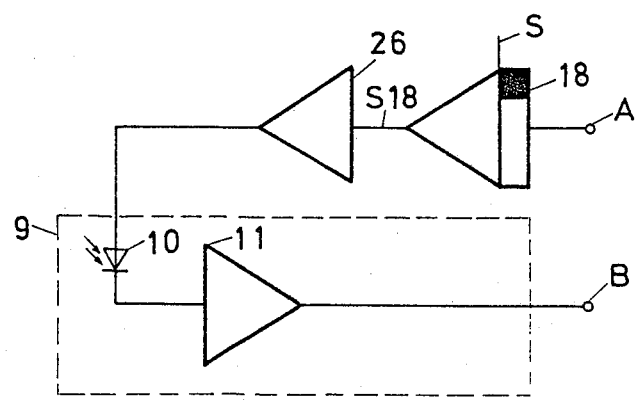

In the typical embodiment of FIG. 5, the gain factor of the signal amplifier 9 is adjusted by adjusting the bias voltage of an avalanche photodiode 10, the anode of which is connected to the output of the instantaneous-value memory 18 via a 2nd post amplifier 25.

INDUSTRIAL APPLICABILITY

The method described for automatic compensation of attenuation is primarily suitable for measurements in an environment with high electromagnetic interference such as high-voltage laboratories and in simulators for nuclear electromagnetic pulses (NEMP simulators), for measurements of signals which exhibit a high proportion of a common-mode signal, for example measurements on thyristor circuits and for measurements of the shielding effect of equipment housings.

We claim:

1. Method for automatic compensation of the attenuation of a fiber optical measurement value transmission
   (a) with a signal transmitter (1) which exhibits at least one electrooptical transducer (6) for converting electrical signals into optical signals,
   (b) with a signal receiver (9) which exhibits at least one optoelectrical transducer (10) for converting optical signals into electrical signals,
   (c) the electrooptical transducer (6) being effectively connected via at least one optical waveguide (8) to the optoelectrical transducer (10),
   (d) an electrical measurement value signal (S1), which is supplied to the input of the signal transmitter (1), being supplied via a switch (3) to the electrooptical transducer (6) but being disconnected from the transmission to the electrooptical transducer (6) during a predeterminable period of disconnection, (e) an electrical output signal (S9) of the signal receiver (9) occurring during this disconnection period being compared with a reference signal ($U_{REF}$), wherein.

(f) a gain factor of the signal receiver (9) is controlled in dependence on a difference signal (S14) produced by this comparison in such a manner that this difference signal becomes at least approximately zero.

2. Method as claimed in claim 1, wherein
(a) the difference signal (S14) is subjected to lowpas filtering (16) and
(b) after a subsequent post amplification (17), is stored as signal (S18) which determines the gain factor of the signal receiver (9).

3. Method as claimed in claim 1 or 2, wherein
(a) the controlling of the gain factor is interrupted after the disconnection period has elapsed and
(b) the gain factor remains set to the value calibrated by the action of the control system after the disconnection period has elapsed until the measurement value signal is again disconnected.

4. Method as claimed in one of claims 1 to 3, wherein the input of the electrooptical transducer (6) is effectively connected to a reference potential (U0) during the disconnection period.

5. Automatic attenuation compensation device for a signal transmission system with an optical waveguide (8)
(a) with a signal transmitter (1) which exhibits at least one electrooptical transducer (6) for converting electrical signals into optical signals and which has at its input a signal input (2) for an electrical measurement value signal (S1) to be transmitted,
(b) with a signal receiver (9) which exhibits at least one optoelectrical transducer (10) for converting optical signals into electrical signals and which has at its output a signal output (B) for an output signal (S9),
(c) the electrooptical transducer (6) being effectively connected to the optoelectrical transducer (10) via at least one optical waveguide (8),
(d) with -an amplifier (4), the input of which is effectively connected via a switch (3) to the signal input (2) for the measurement value signal (S1) and the output of which is effectively connected to the electrooptical transducer (6),
(e) with a comparator (14), the input of which is effectively connected on the one hand, to the output (B) of the signal receiver (9) and, on the other hand, to a reference voltage ($U_{REF}$) and at the output of which the output signal (S14) of the attenuation compensation device can be picked up, wherein (f) the signal receiver (9) exhibits a gain factor adjusting element and
(g) the output of the comparator (14) is effectively connected to this gain factor adjusting element via an instantaneous-value memory (18).

6. Automatic attenuation compensation device as claimed in claim 5, wherein
(a) the output of the comparator (14) is effectively connected via a lowpass filter (16) and
(b) via a 1st post amplifier (17), following the filter, to the instantaneous-value memory (18).

7. Automatic attenuation compensation device as claimed in claim 5 or 6, wherein
(a) the gain factor adjusting element of the signal receiver (9) is a potentiometer (21), the input of which is effectively connected to the optoelectrical transducer (10) and the output of which is effectively connected to a non-inverting input of the comparator (14),
(b) the instantaneous-value memory is a motor (20) and
(c) the motor is controllingly connected to the potentiometer.

8. Automatic attenuation compensation device as claimed in claim 5 or 6, wherein
(a) the gain factor adjusting element of the signal receiver (9) is a multiplier (22),
(b) the input of which is effectively connected, on the one hand, to the optoelectrical transducer (10) and
(c) on the other hand, to the output of the instantaneousvalue memory (18), and
(d) the output of which is effectively connected to a or the non-inverting input of the comparator (14).

9. Automatic attenuation compensation device as claimed in claim 5 or 6, wherein
(a) the gain factor adjusting element of the signal receiver (9) is an electrically or optically controllable resistance (24) which is effectively connected to the output (B) of the signal receiver (9), and
(b) which is controlled as a function of the output signal (S18) of the instantaneous-value memory (18).

10. Automatic attenuation compensation device as claimed in claim 5 or 6, wherein
(a) the gain factor adjusting element of the signal receiver (9) is the optoelectrical transducer (10),
(b) the gain factor of which is controlled by means of its bias voltage as a function of the output signal (S18) of the instantaneous-value memory (18).

* * * * *